US008465638B2

(12) United States Patent
Wang

(10) Patent No.: US 8,465,638 B2
(45) Date of Patent: Jun. 18, 2013

(54) MATRIX ELECTRODE-CONTROLLING DEVICE AND DIGITAL PLATFORM USING THE SAME

(75) Inventor: Chun-Han Wang, Kaohsiung (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 236 days.

(21) Appl. No.: 12/908,274

(22) Filed: Oct. 20, 2010

(65) Prior Publication Data

US 2011/0042220 A1 Feb. 24, 2011

Related U.S. Application Data

(62) Division of application No. 11/462,988, filed on Aug. 7, 2006.

(30) Foreign Application Priority Data

Dec. 21, 2005 (TW) .............................. 94145456 A

(51) Int. Cl.
*G05D 7/06* (2006.01)

(52) U.S. Cl.
USPC .......................................... 204/600; 204/663

(58) Field of Classification Search
USPC .................... 204/600, 450, 660, 663; 347/55, 347/74–78, 81; 345/107
See application file for complete search history.

(56) References Cited

U.S. PATENT DOCUMENTS

2004/0231987 A1* 11/2004 Sterling et al. ................ 204/450

OTHER PUBLICATIONS

Marmur, The Lotus Effect: Superhydrophobicity and Metastability, Langmuir, 20, 2004.*
Lienemann et al., Electrode shapes for electrowetting arrays, Nanotech, 1, 2003, 94-97.*

* cited by examiner

*Primary Examiner* — Luan Van
*Assistant Examiner* — Gurpreet Kaur
(74) *Attorney, Agent, or Firm* — Egbert Law Offices, PLLC

(57) ABSTRACT

A matrix electrode-controlling device for driving a droplet according to this aspect of the present invention comprises a substrate, a dielectric layer positioned on the substrate, a plurality of control electrodes positioned in the dielectric layer in a matrix manner, and a ground electrode positioned at a predetermined position around the control electrodes without generating electromagnetic shielding effect. The control electrodes in the same row are electrically connected to form a plurality of lateral controlling rows and the control electrodes in the same column are electrically connected to form a plurality of longitudinal controlling columns, and the droplet is driven to move on or above the dielectric layer by biasing the ground electrode to the ground voltage and applying a predetermined voltage to one of the controlling rows and/or to one of the controlling columns to undergo the predetermined assaying operation.

14 Claims, 8 Drawing Sheets

MATRIX ELECTRODE-CONTROLLING DEVICE AND DIGITAL PLATFORM USING THE SAME

CROSS-REFERENCE TO RELATED APPLICATIONS

This application is a Divisional application of application Ser. No. 11/462,988, filed Aug. 7, 2006, presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a matrix electrode-controlling device and a digital platform using the same, and more particularly, to a matrix electrode-controlling device for driving a droplet and a digital platform for assaying a fluid using the same.

2. Description of Related Art Including Information Disclosed Under 37 CFR 1.97 and 37 CFR 1.98

Controlling a droplet under test is an important technique for the biomedical assaying operation. To date, electrowetting is used as the conventional technique, which uses top and bottom electrodes in a sandwich structure to control the movement of the droplet, as disclosed in U.S. Pat. No. 6,565,727. However, the conventional technical faces a technical problem in that the droplet is restricted in space between the top and the bottom electrodes such that adding extra additives into the droplet under test from the top side or the bottom side of the droplet during an assaying process is quite difficult. In addition, the conventional technique does not possess the ability of controlling the movements of multiple droplets simultaneously, and therefore the conventional technique is restricted from being applied to the processes of assaying samples such as genes or protein chips.

Chip design using the electrowetting effect to drive the droplet generally use the following two methods to apply a predetermined voltage to the control electrodes:

Method 1: assigning connecting wires to each control electrode, and applying voltage to the desired control electrode to generate the electrowetting effect by directly applying the voltage to the desired control electrode via the assigned connecting wire (see: Pollack, M. G., Fair, R. B., and Shenderov, A. D., Electrowetting-based actuation of liquid droplets for microfluidic applications, Appl. Phys. Lett. 77 (2000) 1725-1726).

Method 2: using the opto-electrowetting (OEW) technique, in which connecting wires connecting the control electrodes are biased to a predetermined voltage in advance, and an optically sensitive material is positioned between the control electrodes and the connecting wires such that the control electrode is not biased to the predetermined voltage. A laser light irradiates on the optical sensitive material to bias the predetermined voltage to certain control electrodes to generate the driving force (see: Chiou, P. Y., Chang, Z., and Wu, M. C., Light actuated microfluidic devices, MEMS-03 (2003) 355-358).

Method 1 is a direct design, but requires a number of connecting wires to connect each control electrode to the power supply, and the circuit layer is quite complicated for a design with a large number of control electrodes. Method 2 solves the complicated circuit layout problem, but needs additional laser sources, which make the entire system very large.

To solve the above problems, researchers try to incorporate Method 1 and Method 2 to achieve two-dimensional driving ability of the droplet (see: Fan, S. K., Hashi, C., and Kim, C. J., Manipulation of multiple droplet on N×M grid by cross-reference EWOD driving scheme and pressure-contact package, MEMS-03 (2003) 694-697). Nevertheless, this technique also faces the same problem as Method 1 and Method 2 due to use of the electrowetting on dielectric (EWOD) design, i.e., the top and bottom electrodes in the sandwich structure restrict the space for adding extra additives.

The inventor of the present invention recognizes the above issue and provides a matrix electrode-controlling device using a single side electrode architecture to reduce the required space such that both the complicated circuit layout problem for a design with a large number of control electrodes and the huge system issue can be resolved, and some possible new applications can be created.

BRIEF SUMMARY OF THE INVENTION

One aspect of the present invention provides a matrix electrode-controlling device for driving a droplet and a digital platform for assaying a fluid using the same, which can drive a droplet to move so as to undergo a predetermined assaying operation.

A matrix electrode-controlling device for driving a droplet according to this aspect of the present invention comprises a substrate, a dielectric layer positioned on the substrate, a plurality of control electrodes positioned in the dielectric layer in a matrix manner, and a ground electrode positioned at a predetermined position around the control electrodes without generating electromagnetic shielding effect. The control electrodes in the same row are electrically connected to form a plurality of lateral controlling rows. The control electrodes in the same column are electrically connected to form a plurality of longitudinal controlling columns. The droplet is driven to move on or above the dielectric layer by biasing the ground electrode to the ground voltage and applying a predetermined voltage to one of the controlling rows and/or to one of the controlling columns to undergo the predetermined assaying operation.

Another aspect of the present invention provides a matrix electrode-controlling device for driving a droplet, and the matrix electrode-controlling device comprises a substrate, a dielectric layer positioned on the substrate, a plurality of control electrodes positioned in the dielectric layer in a matrix manner, and a ground electrode positioned at a predetermined position around the control electrodes without generating electromagnetic shielding effect. Each control electrode includes a first conductive region and a second conductive region; the first conductive regions of the control electrodes in the same row are electrically connected to form a plurality of lateral controlling rows, and the second conductive regions of the control electrodes in the same column are electrically connected to form a plurality of longitudinal controlling columns. The droplet is driven to move on or above the dielectric layer by biasing the ground electrode to the ground voltage and applying a predetermined voltage to one of the controlling rows and/or to one of the controlling columns to undergo the predetermined assaying operation.

A further aspect of the present invention provides a digital platform for assaying a fluid, and the digital platform comprises a matrix electrode-controlling device for driving a droplet, a probing device electrically connected to the matrix electrode-controlling device and a control unit electrically connected to the matrix electrode-controlling device and the probing device. The control unit is configured to control the droplet to undergo a digital operation via the matrix electrode-controlling device, and to control the droplet to undergo a digital probing process via the probing device. Preferably, the control unit is a computer.

BRIEF DESCRIPTION OF THE SEVERAL VIEWS OF THE DRAWINGS

The objectives and advantages of the present invention will become apparent upon reading the following description and upon reference to the accompanying drawings in which.

DETAILED DESCRIPTION OF THE INVENTION

To solve the prior art problems, one embodiment of the present invention arranges the control electrodes in a matrix manner to simplify the circuit layout of the connecting wires and connecting sites for the control electrodes. Particularly, the control electrodes are connected in series in the lateral and the longitudinal direction to simplify the circuit layout of the connecting wires and connecting sites for the control electrodes of the matrix electrode-controlling device.

For example, an electrode-controlling device having several control electrodes positioned in an m×n matrix manner needs m×n+1 (ground electrode) connecting wires and connecting sites to the power source if each electrode is connected to a power supply via an individual connecting wire. Obviously, the circuit layout will be very complicated. In contrast, the embodiment of the present invention needs only m+n+1 connecting wires and connecting sites to the power source to connect m×n+1 control electrodes to control the movement of the droplet, i.e., m connecting wires for connecting the control electrodes in the same row, n connecting wires for connecting the control electrodes in the same column, and one connecting wire for the ground electrode. Consequently, the circuit layout is dramatically simplified and the large scale control electrodes platform for controlling the movement of the droplet can be achieved.

Figure 1:
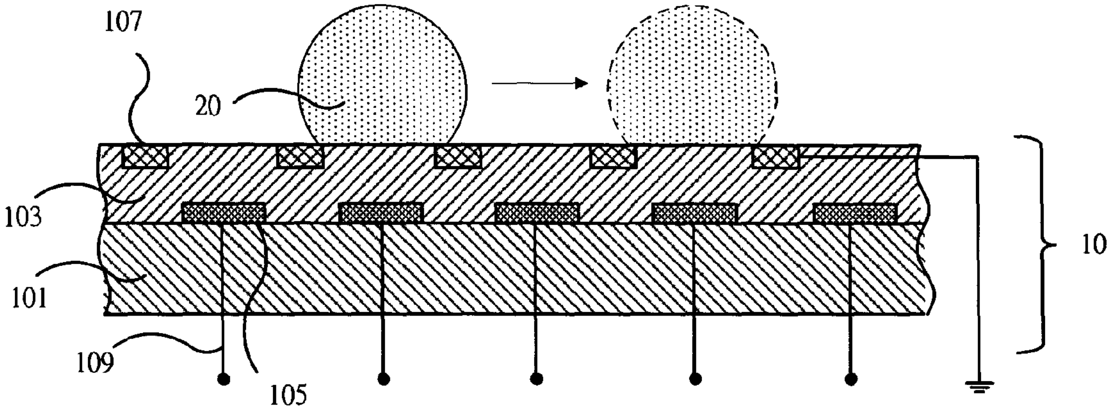
FIG. 1 is a cross-sectional diagram of a matrix electrode-controlling device according to a first embodiment of the present invention.
Figure 2:
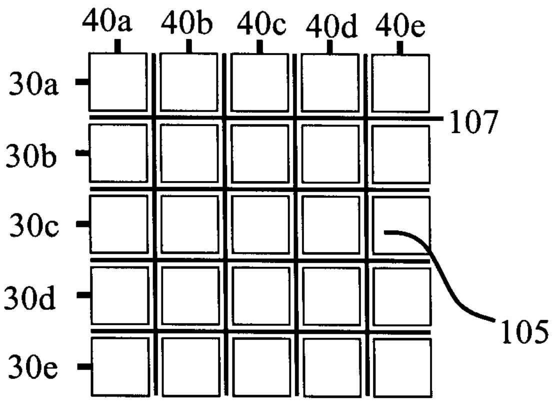
FIG. 2 shows the arrangement of control electrodes of a matrix electrode-controlling device according to a first embodiment of the present invention.
Figure 3:
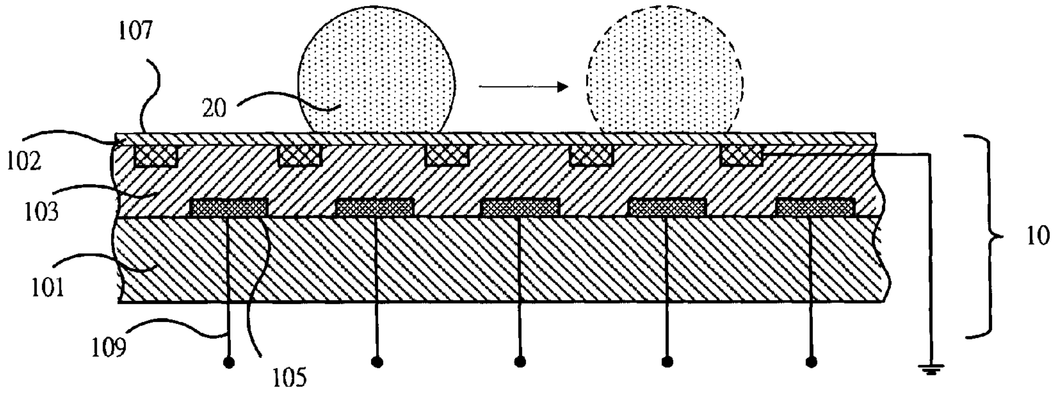
FIG. 3 shows the movement of a droplet driver by a matrix electrode-controlling device according to a first embodiment of the present invention.

FIG. 1 to FIG. 3 illustrate a matrix electrode-controlling device 10 for driving a droplet 20 according to a first embodiment of the present invention. FIG. 1 is a cross-sectional diagram of the matrix electrode-controlling device 10, FIG. 2 shows the arrangement of the control electrodes 105 of the matrix electrode-controlling device 10, and FIG. 3 shows the movement of the droplet 20 driven by the matrix electrode-controlling device 10. The matrix electrode-controlling device 10 comprises a substrate 101, a dielectric layer 103 positioned on the substrate 101, a plurality of control electrodes 105 positioned in the dielectric layer 103 in a matrix manner, and a ground electrode 107 positioned at a predetermined position around the control electrodes 105 without generating electromagnetic shielding effect.

The substrate 101 is preferably a glass substrate, a semiconductor substrate such as silicon substrate or a printed circuit board. The dielectric layer 103 can be made of silicon oxide, silicon nitride, silicon oxynitride or photoresist. Preferably, the dielectric layer 103 has a rough surface to increase the contact angle of the droplet 20 on the rough surface so as to increase the driving force. Particularly, the dielectric layer 103 covers the substrate 101, the control electrodes 105 and the ground electrode 107 such that the control electrodes 105 and the ground electrode 107 are electrically isolated from each other.

The control electrodes 105 and the ground electrode 107 are positioned in the dielectric layer 103, and can be made of metal such as gold, aluminum, silver or copper. In addition, the control electrodes 105 may have an edge of a sawtoothed or irregular shape (not shown in the drawing) to enhance the control ability of the droplet 20 by adjacent control electrodes 105. The ground electrode 107 is preferably positioned around the control electrodes 105, and at a different level from where the control electrodes 105 are positioned such that the projection areas of the ground electrode 107 and the control electrodes 105 do not overlap each other, thereby avoiding the electromagnetic shielding effect, which reduces control of the movement of the droplet 20. A plurality of connecting wires 109 are used to electrically connect the control electrodes 105 and the ground electrode 107 such that the ground electrode can be connected to a ground voltage and these control electrodes 105 can be connected to a predetermined voltage.

FIG. 2 illustrates the matrix electrode-controlling device 10 having 5×5 control electrodes 105 according to one embodiment of the present invention. The significant difference between the prior art and the embodiment of the present invention is that the control electrodes 105 of the matrix electrode-controlling device 10 is arranged in a matrix manner and forms a plurality of lateral controlling rows 30*a*, 30*b*, 30*c*, 30*d*, and 30*e*, and a plurality of longitudinal controlling columns 40*a*, 40*b*, 40*c*, 40*d*, and 40*e*. Consequently, the matrix electrode-controlling device 10 needs a total of 5+5+1=11 connecting wires 109 and connecting sites to connect a total of 5×5+1=26 control electrodes 105 plus one ground electrode 107. In contrast, the prior art needs a total of 26 connecting wires and connecting sites to connect a total of 5×5+1=26 control electrodes. Obviously, the number of connecting wires 109 required for the embodiment of the present invention is dramatically decreased from 26 down to 11.

To drive the droplet 20 to move on or above the dielectric layer 103, the ground electrode 107 is biased to the ground voltage, and a predetermined voltage is applied to the control electrodes 105 of one of the controlling rows 30*a*, 30*b*, 30*c*, 30*d*, and 30*e*, and/or to the control electrodes 105 of one of the controlling columns 40*a*, 40*b*, 40*c*, 40*d*, and 40*e*, as shown in FIG. 1. Particularly, several droplets 20 can be driven to move on the dielectric layer 103 in a two dimensional manner by applying the predetermined voltage to the controlling rows 30*a*, 30*b*, 30*c*, 30*d*, and 30*e*, and/or to one of the controlling columns 40*a*, 40*b*, 40*c*, 40*d*, and 40*e* in a certain sequence.

Referring to FIG. 3, a hydrophobic layer 102 made of hydrophobic material such as Teflon ($C_2F_4$) can be positioned on the dielectric layer 103 and the droplet 20 is moved on the surface of the hydrophobic layer 102. The hydrophobic layer 102 can increase the contact angle of the droplet 20 and the dielectric layer 103 to have a better driving control ability.

Figure 4:
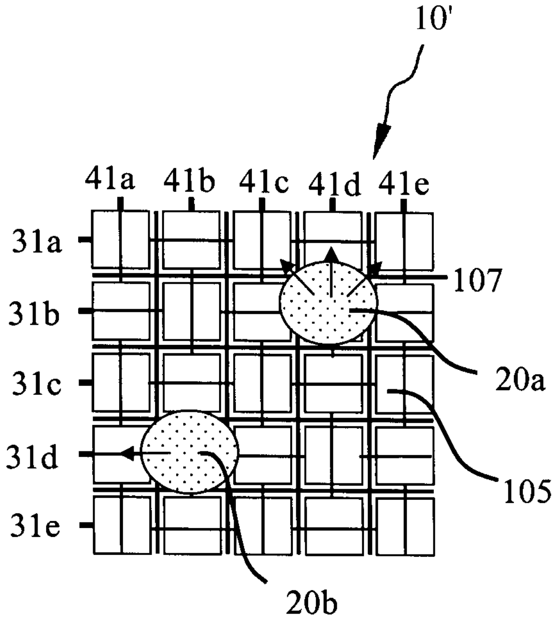
FIG. 4 illustrates a matrix electrode-controlling device according to a second embodiment of the present invention.

FIG. 4 illustrates a matrix electrode-controlling device 10' for driving droplets 20*a* and 20*b* according to a second embodiment of the present invention. In comparison to the matrix electrode-controlling device 10 in FIG. 1 having all control electrodes 105 in the same row/columns electrically connected to form the controlling row/column, the matrix electrode-controlling device 10' in FIG. 4 has the control electrodes 105 in the same row electrically connected in an alternate manner to form several lateral controlling rows 31*a*, 31*b*, 31*c*, 31*d*, and 31*e*, and the control electrodes 105 in the same column electrically connected in an alternate manner to form several longitudinal controlling columns 41*a*, 41*b*, 41*c*, 41*d*, and 41*e*.

Figure 5:
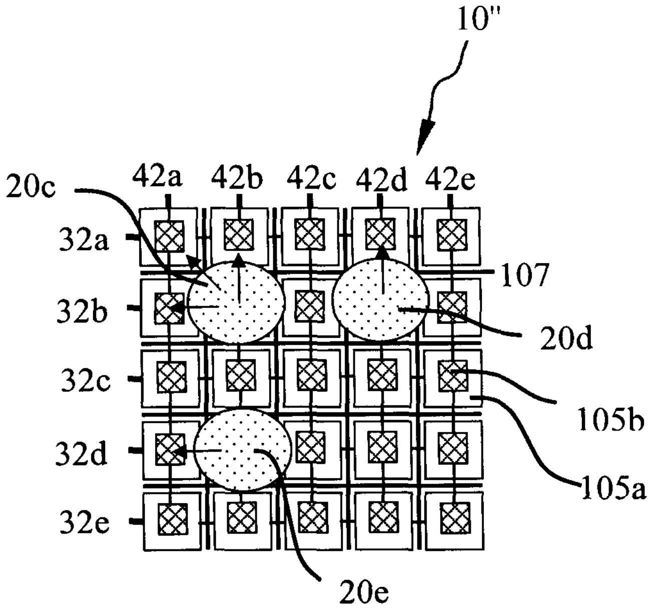
FIG. 5 illustrates a matrix electrode-controlling device according to a third embodiment of the present invention.

To drive the droplet 20*a* to move upward, the ground electrode 107 is connected to the ground voltage, and a predetermined voltage is applied to the control electrodes 105 of the controlling rows 31*a* such that the electrowetting effect occurs to generate driving forces on the droplet 20*a* as shown by the arrows, while the droplet 20*b* on the controlling row 31*d* away from the effective controlling row 31*a* does not move since there is no electrowetting effect. Similarly, the ground electrode 107 is connected to the ground voltage, and a predetermined voltage is applied to the control electrodes 105 of the controlling column 41*a* such that the electrowetting effect occurs to generate driving forces on the droplet 20*b* to move the droplet 20*b* leftward as shown by the arrows, while the droplet 20*a* on the controlling row 41*d* away from the effective controlling row 41*a* does not move since there is no electrowetting effect FIG. 5 illustrates a matrix electrode-controlling device 10" for driving droplets 20*c*, 20*d* and 20*e* according to a third embodiment of the present invention. The control electrodes 105 are arranged in a matrix manner, and each control electrode 105 includes a first conductive region 105*a* and a second conductive region 105*b*. The plural first conductive regions 105*a* of the plural control electrodes 105 in the same row are electrically connected to form a plurality of lateral controlling rows 32*a*, 32*b*, 32*c*, 32*d*, and 32*e*. Meanwhile, the plural second conductive regions 105*b* of the plural control electrodes 105 in the same column are electrically connected to form a plurality of longitudinal controlling columns 42*a*, 42*b*, 42*c*, 42*d*, and 42*e*. The control electrodes 105 in the same row/column are electrically connected laterally/longitudinally to provide coordinated coverage of the control electrodes 105 in the same row/column.

To drive the droplet 20*c* and the droplet 20*e* to move upward as indicated by the arrow, the ground electrode 107 is connected to the ground voltage, and a predetermined voltage is applied to the controlling columns 32*a* such that the electrowetting effect occurs at the first conductive region 105*a* of the controlling row 32*a* to generate upward driving forces on the droplet 20*c* and the droplet 20*d* to move them upward as shown by the arrows, while the droplet 20*e* on the controlling row 32*d* away from the effective controlling row 32*a* does not move since there is no electrowetting effect. Similarly, the ground electrode 107 is connected to the ground voltage, and a predetermined voltage is applied to the control electrodes 105 of the controlling column 42*a* such that the electrowetting effect occurs at the second conductive region 105*b* of the controlling column 42*a* to generate leftward driving forces on the droplet 20*c* and the droplet 20*e* to move them leftward as shown by the arrows, while the droplet 20*d* on the controlling column 42*d* away from the effective controlling row 42*a* does not move since there is no electrowetting effect.

Likewise, the ground electrode 107 is connected to the ground voltage, and a predetermined voltage is applied to the control electrodes 105 of both the control row 32*a* and the controlling column 42*a* such that the electrowetting effect occurs at the first conductive region 105*a* of the controlling row 32*a* and at the second conductive region 105*b* of the controlling column 42*a* to generate upward and leftward driving forces on the droplet 20*c* to move the droplet 20*c* upward and leftward as shown by the arrows. The droplet can be optionally moved upward, downward, leftward or rightward to a desired position by applying the predetermined voltage to the controlling rows 32*a*, 32*b*, 32*c*, 32*d*, and 32*e*, and/or to one of the controlling columns 42*a*, 42*b*, 42*c*, 42*d*, and 42*e* in a certain sequence. Particularly, the matrix electrode-controlling device 10" allows for the simultaneous driving of multiple droplets by proper application of predetermined voltage to the controlling rows and/or columns.

The matrix electrode-controlling device 10' shown in FIG. 4 uses an alternate design, and the matrix electrode-controlling device 10" shown in FIG. 5 uses a dual conductive regions design. Since each control electrode 105 needs lateral and longitudinal connecting wires 109 to form electric connecting, there are intersections at the lateral connecting wires 109 and the longitudinal connecting wires 109, which are perpendicular to each other. Furthermore, each connecting wire 109 needs to pass over one control electrode to connect two staggered control electrodes separated by a central control electrode. Obviously, the layout of the connecting wires 109 is quite complicated, and the present invention provides a new architecture for the circuit layout of the connecting wires 109.

Figure 6:
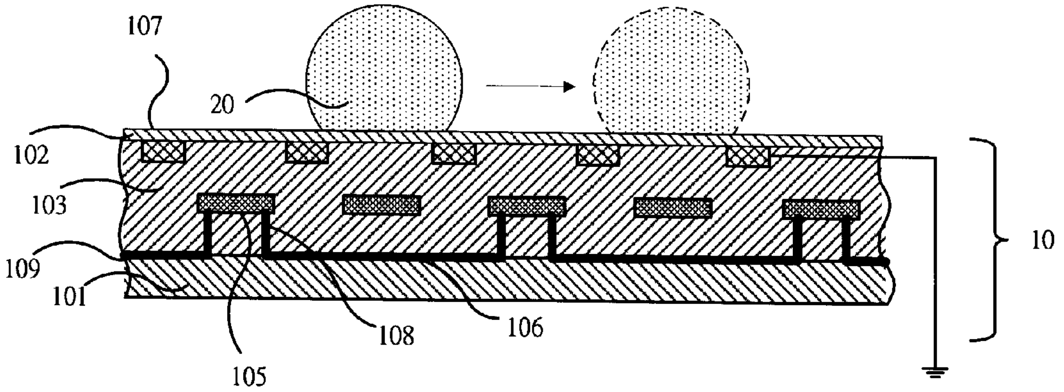
FIG. 6 illustrates a circuit layout for a circuit layer of connecting wires according to one embodiment of the present invention.

FIG. 6 illustrates a circuit layout for the connecting wires 109 according to one embodiment of the present invention. The present invention provides dual layer connecting wires to solve the above problems. Taking the matrix electrode-controlling device 10' in FIG. 4 for example, a circuit layer 106 is positioned between the control electrodes 105 and the substrate 101, and the circuit layer 106 comprises a plurality of connecting wires 109 electrically connected to the control electrodes 105 of the controlling rows/columns for applying the predetermined voltage thereto. Furthermore, a plurality of vertical connecting wires 108 are used to electrically connect the control electrodes 105 and the horizontal connecting wires 109 of the circuit layer 106 such that the connecting wires 109 can pass over one control electrode to connect two control electrodes on either side of the passed-over electrode. Consequently, the connecting wires 109 of the circuit layer 106 can connect the control electrodes 105 laterally and longitudinal without the occurrence of short circuit at the intersection.

The matrix electrode-controlling device 10" shown in FIG. 5 uses a dual conductive regions design, in which each control electrode 105 includes the laterally-connected first conductive regions 105*a* and the longitudinally-connected second conductive regions 105*b*, and each control electrode 105 is preferably omni-directional such that the droplets 20*c*, 20*d* and 20*e* can be optionally moved upward, downward, leftward or rightward. In addition, the first conductive regions 105*a* and the second conductive regions 105*b* are preferably positioned on the same plane.

Figure 7A:
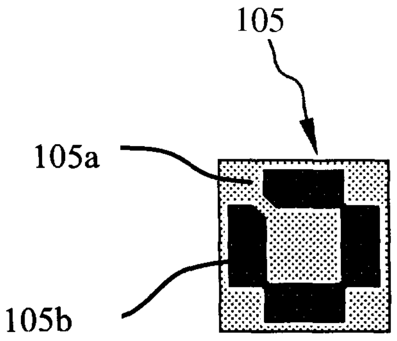
FIG. 7*a* and FIG. 7*b* illustrate control electrodes according to one embodiment of the present invention.
Figure 7B:
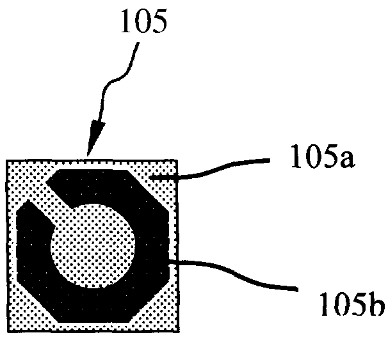

FIG. 7*a* and FIG. 7*b* illustrate the control electrodes 105 according to one embodiment of the present invention. Each control electrode 105 includes the two conductive regions 105*a* and 105*b* electrically isolated from each other. Particularly, the first conductive regions 105*a* and the second conductive regions 105*b* substantially surround one another to form two electrically isolated conductive regions, i.e., one inner conductive region and one outer conductive region, and the inner conductive regions extends to the peripheral of the control electrodes 105 such that the perimeter lengths of the droplet in the two conductive regions are substantially equivalent. Consequently, the droplet on the control electrodes 105 contacts both of the two conductive regions 105*a* and 105*b* of the adjacent control electrodes 105, and the control ability of the driving force on the droplet is improved to move the droplet upward, downward, to the left or right more smoothly.

Figure 8:
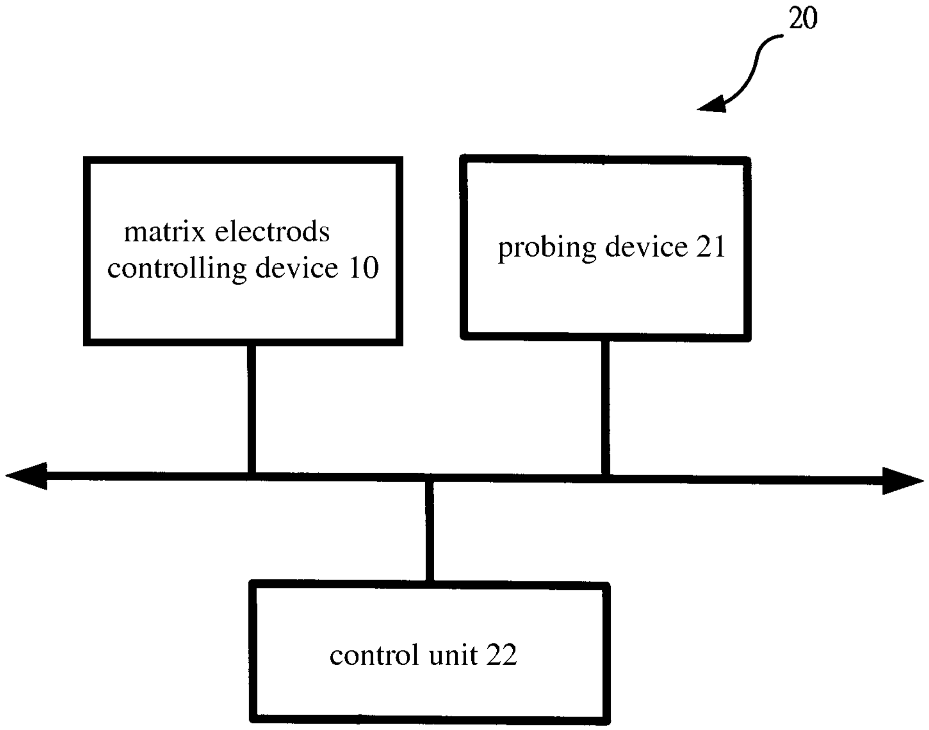
FIG. 8 illustrates a digital platform for assaying a fluid according to one embodiment of the present invention.

FIG. 8 illustrates a digital platform 20 for assaying a fluid according to one embodiment of the present invention, wherein the digital platform 20 incorporates the above matrix electrode control device for undergoing a digital operation or a digital probing process. The digital platform 20 comprises a matrix electrode-controlling device 10 for driving a droplet, a probing device 21 electrically connected to the matrix electrode-controlling device 10 and a control unit 22 electrically connected to the matrix electrode-controlling device 10 and the probing device 21. The matrix electrode-controlling device 10 can be any one as described above for controlling the digital operation of the droplet. The control unit 22 is preferably a computer configured to control the droplet to undergo the digital operation via the matrix electrode-controlling device 10, and to control the droplet to undergo a digital probing process via the probing device 21. In addition, the digital platform 20 can further comprise sensors or meters such as pH meters, which serve as personal medical assistants.

The above-described embodiments of the present invention are intended to be illustrative only. Numerous alternative embodiments may be devised by those skilled in the art without departing from the scope of the following claims.

I claim:

1. A matrix electrode-controlling device for driving a droplet, the matrix electrode-controlling device comprising:

a substrate;

a dielectric layer positioned on said substrate;

a plurality of control electrodes positioned inside said dielectric layer in a matrix manner, each control electrode having a first conductive region and a second conductive region, wherein each first conductive region of the control electrodes in a same row are electrically connected to form a plurality of controlling rows, and wherein each second conductive region of the control electrodes in a same column are electrically connected to form a plurality of controlling columns; and a ground electrode positioned at a predetermined position around the control electrodes without generating an electromagnetic shielding effect;

wherein the droplet is driven to move on or above said dielectric layer by applying a predetermined voltage to one of the controlling rows or to one of the controlling columns; and wherein the first and second conductive regions of the control electrode are driven independently.

2. The matrix electrode-controlling device of claim 1, wherein said dielectric layer has a rough surface.

3. The matrix electrode-controlling device of claim 1, further comprising:

a hydrophobic layer positioned on said dielectric layer, said droplet being movable on a surface of said hydrophobic layer.

4. The matrix electrode-controlling device of claim 1, further comprising:

a circuit layer positioned on said substrate, said circuit layer comprising a plurality of connecting wires electrically connected to the control electrodes of the controlling rows and the control electrodes of the controlling columns for applying the predetermined voltage thereto.

5. The matrix electrode-controlling device of claim 4, wherein the connecting wires of said circuit layer connect the control electrodes substantially in a vertical manner.

6. The matrix electrode-controlling device of claim 1, wherein each of the first conductive regions and each of the second conductive regions are positioned on the same plane.

7. The matrix electrode-controlling device of claim 1, wherein the control electrodes have an edge of a sawtoothed or irregular shape.

8. A matrix electrode-controlling device for driving a droplet, the matrix electrode-controlling device comprising:

a substrate;

a dielectric layer positioned on said substrate;

a plurality of control electrodes positioned inside said dielectric layer in a matrix manner, each control electrode having a first conductive region and a second conductive region, wherein each first conductive region of the control electrodes in a same row are electrically connected to form a plurality of controlling rows, and wherein each second conductive region of the control electrodes in a same column are electrically connected to form a plurality of controlling columns; and a ground electrode positioned at a predetermined position around the control electrodes without generating an electromagnetic shielding effect;

wherein the droplet is driven to move on or above said dielectric layer by applying a predetermined voltage to one of the controlling rows or to one of the controlling columns;

wherein the first and second conductive regions of the control electrode are driven independently; and wherein each of the first conductive regions and each of the second conductive regions substantially surround one another.

9. The matrix electrode-controlling device of claim 8, wherein said dielectric layer has a rough surface.

10. The matrix electrode-controlling device of claim 8, further comprising:

a hydrophobic layer positioned on said dielectric layer, said droplet being movable on a surface of said hydrophobic layer.

11. The matrix electrode-controlling device of claim 8, further comprising:

a circuit layer positioned on said substrate, said circuit layer comprising a plurality of connecting wires electrically connected to the control electrodes of the controlling rows and the control electrodes of the controlling columns for applying the predetermined voltage thereto.

12. The matrix electrode-controlling device of claim 11, wherein the connecting wires of said circuit layer connect the control electrodes substantially in a vertical manner.

13. The matrix electrode-controlling device of claim 8, wherein each of the first conductive regions and each of the second conductive regions are positioned on the same plane.

14. The matrix electrode-controlling device of claim 8, wherein the control electrodes have an edge of a sawtoothed or irregular shape.

* * * * *